No. 12,297. REISSUED DEC. 27, 1904.

R. STRAIN.

FRUIT GRADER.

APPLICATION FILED OCT. 21, 1903.

Witnesses:
F. A. Mansfield
Frederick Shyon

Inventor:
Robert Strain
by Townsend Bros
Attys.

No. 12,297. Reissued December 27, 1904.

UNITED STATES PATENT OFFICE.

ROBERT STRAIN, OF FULLERTON, CALIFORNIA, ASSIGNOR TO FRED STEBLER AND AUSTIN A. GAMBLE, OF RIVERSIDE, CALIFORNIA.

FRUIT-GRADER.

SPECIFICATION forming part of Reissued Letters Patent No. 12,297, dated December 27, 1904.

Original No. 730,412, dated June 9, 1903. Application for reissue filed October 21, 1903. Serial No. 177,990.

*To all whom it may concern:*

Be it known that I, ROBERT STRAIN, a citizen of the United States, residing at Fullerton, in the county of Orange and State of California, have invented new and useful Improvements in Graders, of which the following is a specification.

My invention relates to that class of graders designed to assort fruits, vegetables, such as potatoes, and nuts into lots of different sizes; and the objects thereof are to provide a machine for that purpose which is adjustable to a number of grades and which will prevent the fruit from bruising or being crushed. I accomplish these objects by the machine described herein and illustrated in the accompanying drawings, in which—

Figure 1:
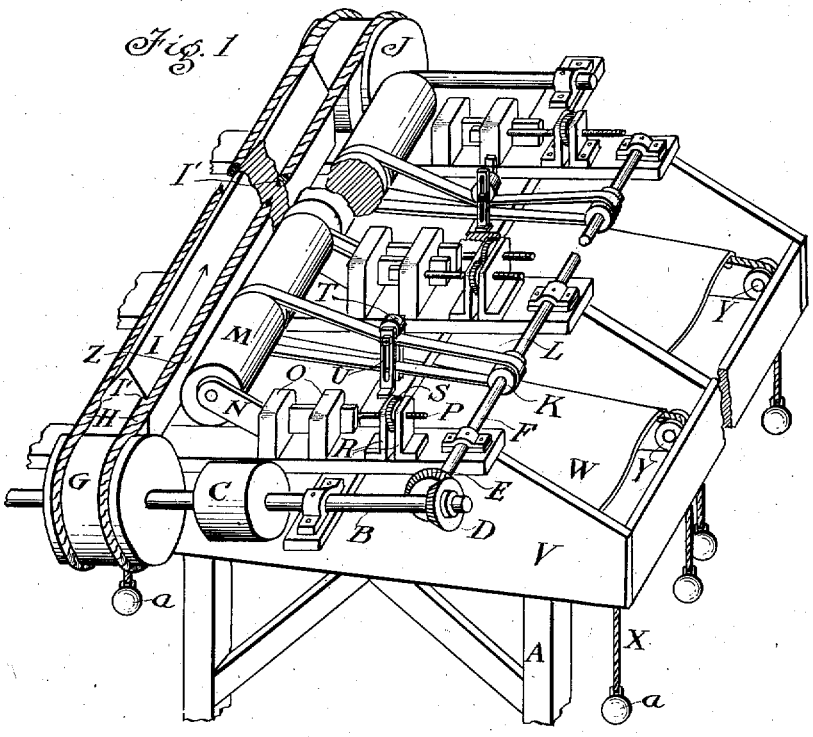
Figure 2:
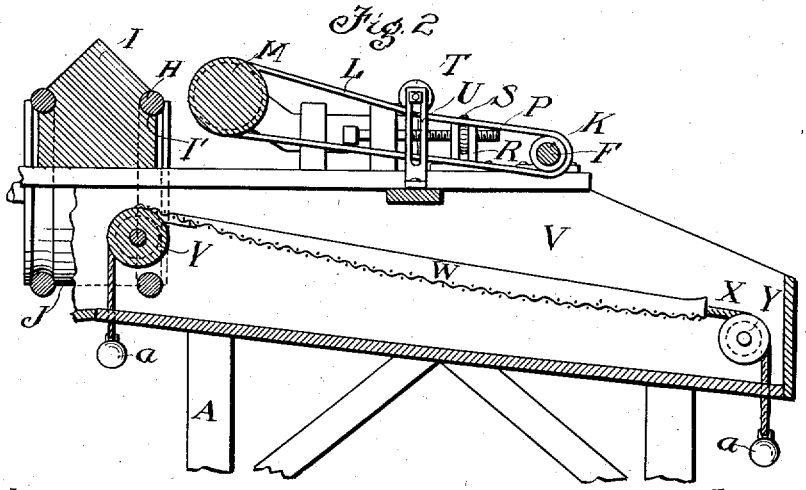

Figure 1 is a perspective view of a fragment of my machine arranged for grading oranges or lemons. Fig. 2 is a cross-section.

In the drawings my machine is designed as a double grader—that is, two graders arranged side by side on the same frame, one side being a duplicate of the other side.

A represents the frame of the machine, on the top of which at one end of the machine, preferably at the upper end, is transversely mounted the driving-shaft B, carrying the driving-pulley C, by means of which motion is imparted thereto. When arranged as a double grader, on each end of the driving-shaft is rigidly mounted driving bevel-gears D, which mesh with driven bevel-gears E, rigidly mounted on the longitudinally-extending driven shafts F. On the driving-shaft is rigidly mounted the rope-driving drum G, which imparts motion to ropes H, which travel in the direction indicated by the arrow in Fig. 1—that is, from head to the foot thereof—in grooves I′ in guide I, which forms one side of the fruit-runway. These ropes pass over pulley J at the lower end of the machine. On the driven shafts F are rigidly mounted a number of driving-pulleys K, which drive belts L, that pass around the grading-rollers M, which are revolubly mounted in adjusting-arms N, which have a longitudinal movement in guide-blocks O, affixed to the top of the frame. To each of these adjusting-arms is affixed a threaded bolt P, which passes through two stop-blocks R, between which is an adjusting-nut S on bolt P in threaded contact therewith, by the rotation of which the grade-rollers are moved toward or from the guide. Affixed to the top of the frame are band-tighteners to tighten the bands when the grade-rollers are moved away from the guide. These band-tighteners are formed of a pulley T, adjustably mounted in slotted uprights U, affixed to the frame. Below the grade-rollers are as many bins V as there are grade-rollers, which are adapted to hold the fruit which will pass between the grade-roller and the guide. In order to prevent the fruit from being bruised, in each bin is mounted an apron W, of strong cloth, the inner end of which is higher than the outer, so that the fruit will roll to the outer end of the bin, where it has but a short distance to fall to reach the bottom of the bin. Each edge of these aprons is fastened to a rope X, which passes over small pulleys Y, affixed to the side of the bin, and each end thereof has a weight *a* to hold the apron taut and to keep it in position. In the operation of my machine the first roller, or that nearest to the shaft B, is adjusted so as to permit the smallest grade of fruit to pass between the roller and the guide. The next roller is adjusted for the next larger grade, and so on for each successive grade. In orange-grading there are usually nine grades. Motion is imparted to the driving-shaft to cause a rope H to travel in a groove I′ in guide I in the direction indicated by the arrow. This causes the grade-rollers to revolve so that the top of the roller travels away from the guide. The fruit is fed into the runway between the guide and the grade-rollers by any suitable device (not shown) in the usual manner.

It will be observed that as the grade-rollers are adjustable the distance between the roller and guide can be made small or large to adapt the machine to grading small nuts or fruits or large nuts or large fruits. It will also be observed that the ropes carry the fruit toward the lower end of the machine and at the same time the grade-rollers are revolving, so as to keep the fruit from sticking in the runway, thereby avoiding any tendency to crush the most delicate fruit. It will also be observed that the inner end of the apron gives a soft yielding surface for the fruit to fall upon a short distance below the roller, thus preventing any danger of its bruising. As the fruit rolls to the outer end of the apron it falls onto the bottom of the bin, and as the end fills up the apron can be moved toward the inner end of the bin, the weights providing for such adjustment. The fruit is packed from the outer end of the bin. By having short grade-rollers separately adjustable very fine grading may be done and more than one roller may be adjusted to the same grade, if desired. If there should be a large quantity of the fruit of a single grade intermixed with a small quantity of fruit of different grades, this feature is very desirable, as a number of bins may be filled with fruit of the same grade.

Having described my invention, what I claim as new, and desire to secure by Letters Patent, is—

1. In a fruit-grader, in combination a plurality of independent transversely-adjustable rotating rollers; a non-movable grooved guide lying parallel with the plane which passes vertically and longitudinally through the center of said rollers, said rollers and guide forming a fruit-runway; a rope in the groove in said guide and means to move said rope.

2. In a fruit-grader having a bin means to break the fall of the fruit from the grading-way comprising a yielding soft apron above the bottom of the bin and extending under the grading-way, said apron having the end thereof under the grading-way at a higher elevation than the other end; the lower end extending to near the outer side of the bin.

3. In a fruit-grader, a grooved longitudinal guide; a rope in said groove; means to impart movement to said rope; one or more rollers lying parallel to said guide revolubly mounted in arms transversely adjustable; means to adjust said arms comprising a threaded bolt passing through two stop-blocks; a nut on said bolt in threaded contact therewith between said stop-blocks; and means to revolve each of said rollers comprising a belt passing around said roller and a pulley mounted on a shaft; and means to impart motion to said shaft.

4. In a fruit-sizing machine, a runway for the fruit comprising coöperating parallel members, one of said members consisting of a series of rolls arranged end to end and disposed progressively at different distances from the other member, forming communicating fruit-discharging apertures of progressively-different widths along the length of the runway, means for adjusting each roll independently to vary the size of the aperture formed thereby, and means for driving the rolls, substantially as described.

5. In a fruit-sizing machine, a supporting-frame, a runway for the fruit comprising coöperating parallel members, one of said members consisting of a series of rolls arranged end to end and disposed progressively at different distances from the other member, forming communicating fruit-discharging apertures of progressively-different widths along the length of the runway, brackets carrying the rolls, means mounted upon the frame for moving each bracket and adjusting each roll independently to vary the size of the aperture formed thereby, and means for driving the rolls, substantially as described.

6. In a fruit-sizing machine, the combination with a supporting-frame, of a fruit-runway formed by a relatively stationary member and a longitudinal series of rolls arranged end to end at different distances from said stationary member, thus providing communicating spaces of progressively-varying sizes for the discharge of the fruit, means for independently adjusting the rolls with relation to said stationary member, means for driving the rolls, and means for positively feeding the fruit along the runway, substantially as set forth.

7. In a fruit-grading machine, the combination with a supporting-frame, of a fruit-runway comprising a relatively stationary member and a series of rolls disposed in parallel relation to said member and arranged end to end at different distances from the stationary member, forming communicating passages of progressively-varying sizes along the runway for the discharge of the fruit, means for adjusting the rolls with relation to the stationary member, means for driving said rolls, and a traveling belt moving in parallel relation to the stationary member and rolls for positively feeding the fruit along the runway, substantially as described.

8. In a fruit-grading machine, the combination with a supporting-frame, of a central longitudinal divider, forming one side of each of two parallel runways, a series of rolls disposed on each side of the divider and arranged end to end at different distances from the divider, forming therewith a runway having progressively-varying discharge-spaces for the fruit, means for adjusting the rolls of each series toward and from the common divider, means for driving the rolls, and belts disposed on opposite sides of the divider for positively feeding the fruit along the runways, substantially as described.

9. In a fruit-sizing machine, the combination with a supporting-frame, of a longitudinal shaft, transverse shafts, one of which is adapted to be driven from a suitable source of power, a runway comprising a relatively stationary member and an adjustable member consisting of a series of rolls arranged parallel therewith and disposed end to end and at different distances from the stationary member, means for independently adjusting the rolls with relation to the stationary member, means for driving the rolls from the longitudinal shaft, and a belt connected with the transverse shafts for positively feeding the fruit along the runway, substantially as set forth.

10. In a fruit-grading machine, a runway formed of two parallel members, one of said members consisting of a series of end-to-end rolls, brackets carrying the rolls, guides for the brackets, and means for adjusting the brackets upon the guides, substantially as set forth.

In testimony whereof I have signed my name to this specification, in the presence of two subscribing witnesses, at Los Angeles, in the county of Los Angeles, State of California, this 14th day of October, 1903.

ROBT. STRAIN.

Witnesses:

FREDERICK S. LYON,
F. M. TOWNSEND.